United States Patent [19]

Bhatti et al.

[11] 4,430,105

[45] * Feb. 7, 1984

[54] METHOD AND APPARATUS FOR FORMING GLASS FIBERS

[75] Inventors: Mohinder S. Bhatti; Alfred Marzocchi, both of Newark, Ohio

[73] Assignee: Owens-Corning Fiberglas Corporation, Toledo, Ohio

[*] Notice: The portion of the term of this patent subsequent to Aug. 3, 1999 has been disclaimed.

[21] Appl. No.: 378,027

[22] Filed: May 14, 1982

Related U.S. Application Data

[63] Continuation of Ser. No. 200,676, Oct. 27, 1980, Pat. No. 4,342,577.

[51] Int. Cl.³ .............................................. C03B 37/025
[52] U.S. Cl. ................................................ 65/1; 65/2; 65/374.12; 29/163.5 R; 219/121 EM; 428/670; 428/940
[58] Field of Search .............................. 65/1, 374.12, 2; 29/163.5 R; 428/670, 940; 219/121 EM

[56] References Cited

U.S. PATENT DOCUMENTS

| | | | |
|---|---|---|---|
| 2,555,372 | 6/1951 | Ramage | 204/38 |
| 2,777,254 | 1/1957 | Siefert et al. | |
| 3,132,928 | 5/1964 | Crooks et al. | 29/198 |
| 3,134,659 | 5/1964 | Labino | 65/2 |
| 3,147,547 | 9/1964 | Kuebrich et al. | 29/528 |
| 3,157,482 | 11/1964 | Nero et al. | 65/17 |
| 3,206,846 | 9/1965 | Slayter et al. | 29/470 |
| 3,235,646 | 2/1966 | Sens | 13/6 |
| 3,248,190 | 4/1966 | Woodward et al. | 65/1 |
| 3,371,409 | 3/1968 | Bonnet et al. | 29/528 |
| 3,461,058 | 12/1969 | Westfield et al. | 204/290 |
| 3,480,523 | 11/1969 | Tyrrell | 204/43 |
| 3,511,306 | 5/1970 | Warkoczewski | 65/15 |
| 3,518,066 | 6/1970 | Bronnes et al. | 29/195 |
| 3,657,784 | 4/1972 | Selman et al. | 29/195 |
| 3,736,109 | 5/1973 | Darling et al. | 29/195 |
| 3,741,735 | 6/1973 | Buttle | 29/198 |
| 3,827,953 | 8/1974 | Haldeman | 204/37 R |
| 3,875,028 | 4/1975 | Atlee et al. | 204/37 R |
| 3,947,333 | 3/1976 | Bianchi et al. | 204/129 |
| 3,971,646 | 7/1976 | Rhodes | 65/157 |
| 3,973,920 | 8/1976 | Tadokoro et al. | 29/194 |
| 4,036,601 | 7/1977 | Weimar et al. | 428/663 |
| 4,066,864 | 1/1978 | Heitmann | 219/121 EM |
| 4,105,828 | 8/1978 | Borchert et al. | 428/665 |
| 4,140,507 | 2/1979 | Costin et al. | 65/2 |
| 4,326,871 | 4/1982 | Harris | 65/12 |

FOREIGN PATENT DOCUMENTS

| | | | |
|---|---|---|---|
| 1033627 | 6/1966 | United Kingdom | 65/1 |
| 1242921 | 8/1971 | United Kingdom | 65/1 |

OTHER PUBLICATIONS

Hot Isostatic Processing, MCIC-77-34, Battele Labs., Columbus, O., Nov. 1977, pp. 1-99.

*Primary Examiner*—Robert L. Lindsay, Jr.
*Attorney, Agent, or Firm*—Ronald C. Hudgens; Robert F. Rywalski; Greg Dziegielewski

[57] ABSTRACT

A laminated wall for a feeder for supplying streams of molten glass to be attenuated into filaments is provided comprising: a refractory metal core having an oxygen impervious, precious metal sheath intimately bonded thereto by hot isostatic pressing to form a laminate, said laminate having at least one aperture extending therethrough adapted to permit said molten material to flow therethrough.

13 Claims, 3 Drawing Figures

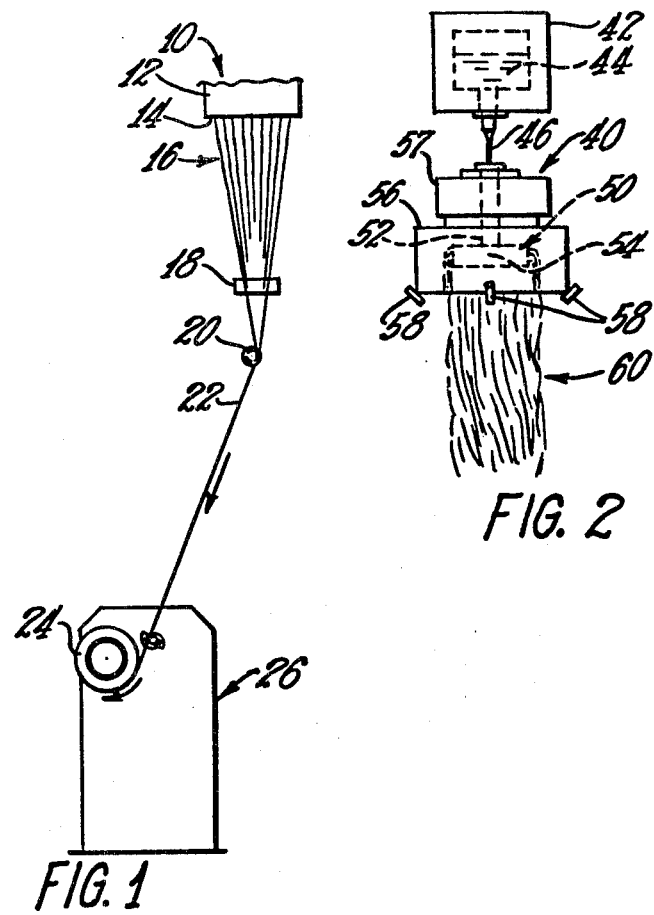
FIG. 2
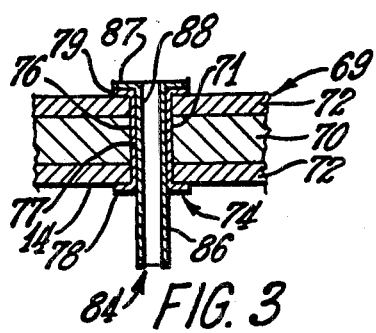
FIG. 1
FIG. 3

METHOD AND APPARATUS FOR FORMING GLASS FIBERS

This is a continuation of application Ser. No. 200,676, filed Oct. 27, 1980 now U.S. Pat. No. 4,342,577 granted Aug. 3, 1982.

TECHNICAL FIELD

The invention disclosed herein relates to a glass fiber forming feeder having at least one laminated wall comprised of a refractory metal substrate having an oxygen impervious, precious metal sheath intimately bonded thereto by means of hot isostatically pressing the precious metal sheath to the refractory metal substrate.

BACKGROUND ART

There has been a long-felt need to produce a long lasting feeder for flowing streams of molten inorganic material, such as glass, at operating temperatures higher than currently practiced.

Much of the previous work was directed to forming alloys having superior properties over the unalloyed metals. Feeders in the textile art, or fixed bushing art, have historically been made from alloys of platinum and rhodium. Feeders in the wool art, or rotatable feeders, have been produced employing Cobalt based alloys.

The present invention provides inorganic fiber forming feeders wherein the high temperature strength characteristics of refractory metals are combined with the oxidation resistance of precious metals to produce feeders capable of operating at temperatures higher and for longer periods of time than heretofore commercially practicable.

DISCLOSURE OF THE INVENTION

This invention pertains to a laminated wall for a feeder for supplying molten streams of inorganic material to be attenuated into filaments comprising a refractory metal core having an oxygen impervious, precious metal sheath intimately bonded thereto by hot isostatic pressing, said wall having at least one orifice extending therethrough adapted to pass said molten material therethrough.

BRIEF DESCRIPTION OF THE DRAWINGS

FIG. 1 is a semi-schematic front elevational view of a glass textile type fiber forming system.

FIG. 2 is a semi-schematic front elevational view of a glass wool or rotary fiber forming system.

FIG. 3 is an enlarged cross sectional view of the orificed walls of the stream feeders shown in FIG. 1 and 2.

BEST MODE OF CARRYING OUT THE INVENTION

As shown in FIG. 1, feeder 10, which is comprised of containment or sidewalls 12 and a bottom, working or stream defining wall 14, is adapted to provide a plurality of streams of molten inorganic material, such as glass. The streams of molten glass can be attenuated into filaments 16 through the action of winder 26.

As is known in the art, size applicator means 18 is adapted to provide a coating or sizing material to the surface of the glass filaments which advance to gathering shoe or means 20 to be gathered into a strand or bundle 22. Strand 22 is then wound into package 24 upon a collet of winder 26. Thus, FIG. 1 schematically represents a "textile" fiber forming system.

As shown in FIG. 2, rotary system 40 is comprised of a flow means or channel 42 having a body of molten inorganic material 44, such as glass, therein. A stream of molten glass 46 is supplied to rotary feeder or rotor 50 from channel 42, as is known in the art.

Rotor 50, which is adapted to be rotated at high speeds is comprised of a quill 52 and a circumferential stream defining or working wall 54 having a plurality of apertures 71, orifices 77, or passageways 88 therethrough adapted to supply a plurality of streams of molten inorganic material to be fiberized.

In conjunction with rotor 50, a shroud 56 and circumferential blower or fluidic attenuation means 57 are adapted to fluidically assist in the attenuation of the streams of molten material into fibers or filaments 60. A binder material or coating may be applied to fiber 60 by means of binder applicators 58 as is known in the art.

As is shown in the drawings, the fiberization or working walls 14 and 54 of the feeders 10 and 50 should be based upon laminate comprised of a refractory metal core having an oxygen impervious, precious metal sheath intimately bonded thereto by hot isostatic pressing (i.e. HIP) as is disclosed in concurrently filed patent application Ser. No. 200,677, filed on Oct. 27, 1980, in the name of Mohinder S. Bhatti, which is hereby incorporated by reference.

Particularly, such refractory metals are selected from the group of materials consisting of molybdenum (Mo), columbium (Cb), tungsten (W), rhenium (Re) tantalum (Ta), hafnium (Hf), titanium (Ti), chromium (Cr), zirconium (Zr), vanadium (V) and base alloys of such refractory metals. For example, an alloy of molybdenum, titanium and zirconium, known as TZM, has been shown to provide a superior laminated wall for a fiber forming feeder when clad with a precious metal alloy of platinum and rhodium.

Particularly, the precious metals are selected from a group consisting of platinum (Pt), paladium (Pd), irridium (Ir), osmium (Os), rhodium (Rh), ruthenium (Ru), and alloys based on such metals. Included in the platinum alloys are H alloy and J alloy which are alloys of platinum and rhodium of about 90%/10% and 75%/25% composition, respectively.

As disclosed in the aforementioned concurrently filed patent application, care should be taken in the preparation of the surfaces of the substrate and precious metal layers to insure a good bond between the core and sheath.

Simply stated, the sheath is formed to closely conform to the exterior of the core, with the surfaces thereof being appropriately cleaned to promote a good metallurgical bond therebetween. The core is inserted or enclosed within the sheath to form a prelaminate unit having at least one edge or portion thereof open to the atmosphere to facilitate "out gasing". Then the prelaminate unit is heated in a vacuum to "out gas" the unit. Subsequent to the out gasing, the open edge or seams of the unit are welded or sealed in a vacuum, whereupon the unit is ready to be hot isostatically pressed to form laminate 69.

As shown in FIG. 3, laminate 69 is formed by hot isostatically pressing core or substrate 70 to sheath 72 to form laminate 69. At this point, sheath 72 should completely surround the exterior of core 70.

A plurality of apertures 71 extending through laminate 69 are formed by any suitable means, such as by drilling. Preferably, apertures 71 are formed in the core 70 and sheath 72 subsequent to the HIP'ing operation or procedure to form laminate 69.

Aperture 71, as such, exposes a portion of refractory metal core 70 which may become exposed to an oxidizing atmosphere during operation. However, the laminate with aperture 71 therethrough still may function if molten glass is continuously maintained in the orifice over the refractory metal core to preclude the oxygen containing atmosphere from contacting the core.

However, in plant operation this is not always practical. Therefore, orifice 71 of laminate 69 should be provided with a precious metal coating or liner 74 sealed or bonded to the sheathing 72 and/or core 70 to prevent the oxidization of the core material.

Insert or element 74 is, preferably, of the same type of precious metal material as the sheath 72. However, different but compatible materials can be employed.

Basically, element 74 is inserted in laminate 69 whereupon first flange or head 78 and second flange or head 79 are formed therein to abut the exterior surfaces of sheath 72. That is, a portion of sheath 72 is positioned intermediate the core 70 and each flange 78 and 79.

Insert 74 may be a solid plug or preferably, may be a hollow eyelet or element having an orifice 77 extending therethrough. Orifice 77 is defined by sleeve 76 which is intermediate and contiguous with flanges 78 and 79.

Preferably, element 74 is provided as a hollow, precious metal eyelet having one flange such as flange 78 preformed therein. Eyelet 74 is then inserted into aperture 71, and the other flange is formed therein such that flanges 78 and 79 are in firm abutting engagement with the sheath 72.

At this point element 74 may be welded or sealed to laminate 69. In one method, flanges 78 and 79 may be electron beam or laser welded to the portion of sheath 72 associated therewith to seal core 70 from the environment or atmosphere surrounding bottom wall 14.

Preferably, element 74 is hot isostatically pressed or gas pressure welded to laminate 69 such that sleeve 76 is intimately bonded to sheath 72 and core 70, and such that flanges 78 and 79 are intimately bonded to sheath 72. Thus, good electrical and thermal conductivity are established through the junction of element 74 and laminate 69.

Consistent with the HIP welding technique set forth in the Metals and Ceramics Information Center Report No. MCIC-77-34 published by the Battelle Columbus Laboratories in November, 1977, the hollow elements 74 may be HIP welded to laminate 69.

With the elements 74 inserted in the laminate 69 as shown in FIG. 3, the laminate 69 is placed inside a sheet metal container having a pressure transmitting media tightly packed between the container and the laminate 69 and in the orifice 77 of each element 74. That is, the pressure transmitting media is tightly packed in all the space within the container not occupied by the laminate 69 and elements 74.

The pressure transducing or transmitting media can be of the type known in the art such as powdered metal, beaded or granulated glass such as Vycor, or amorphous silica. Preferably, orifices 77 are press fit with a solid or fully densified rod of the pressure transducing media, metal or silica, which fluidizes or softens upon the application of heat and pressure during the HIP'ing process as should the rest of the transmitting medium, to insure a full application of pressure to the walls of sleeve 76 to intimately bond the exterior of sleeve 76 to core 70 and/or sheath 72 at orifice 77.

Preferably, the pressure transducing media should not become so fluid as to "wick" between the surfaces to be bonded together.

Subsequently, the pressure transducing media is removed by any suitable means, such as leaching.

It is to be noted, however, that the element 74 and/or members 84 may be HIP welded to laminate 69 and/or each other in the argon fluid of a conventional HIP'ing system if the flanges 78, 79 and 87 are previously hermetically sealed or welded (e.g. EB welded) to laminate 69. That is, the sheet metal box and special pressure transducing media may be dispensed with.

Thus, with HIP welding, flanges 78 or 79 are metallurgically bonded to sheath 72 and sleeve 76 is metallurgically bonded to laminate 69 to provide a laminated fiberization wall 14.

Orifices 77 can be sized to provide the proper passageway adapted to permit molten glass or inorganic material to flow therethrough as either a stationary or rotatable fiber forming system, that is, for textile or wool operation.

In some instances it may be desirable to attach a precious metal, tubular member 84 to laminate 69 and/or one of flanges 78 or 79 or the inner wall of orifice 77. Preferably, member 84 is of the same material as element 79 and sheath 72.

As shown in FIG. 3, tubular member 84 is comprised of a hollow, precious metal shaft 86 having a flange 87 at one end thereof. Passageway 88 extends through shaft 86 and flange 87 and is adapted to permit molten glass and/or inorganic material to flow therethrough.

When referring to attaching member 84 to laminate 69, in addition to attaching tubular member 84 directly to sheath 72, it is also meant that any portion of member 84 may be attached to element 74 that has been joined to laminate 69.

In one method flange 87 of member 84 can be electron beam or laser welded to flange 79 to permanently attach tubular member 84 to laminate 69.

Preferably, tubular member 84 is HIP welded to element 74 and/or laminate 69 consistent with the method set forth above to provide good electrical and thermal contact from member 84 to laminate 69. That is, passageway 88 should be, preferably filled with a solid rod of a suitable pressure transmitting media; of course, orifice is only occupied by member 84.

Instead of two separate HIP'ing operations to bond first element 74 to laminate 69 and a second HIP'ing operation to bond member 84 to element 74 and thus laminate 69, a hollow element 74 may be inserted and flanged or swagged into abutting engagement and then tubular member 84 inserted therein whereupon hollow element 74 and tubular member 84 are bonded together and to laminate 69 substantially simultaneously by means of a single HIP'ing operation.

Working wall 14 can be combined with sidewalls 12 to form a textile type feeder 10 having a tipless bottom wall. Or, a hollow tubular member or tip 84 can be attached to the laminate 69 to form a "tipped" working wall 14 as shown in FIG. 3. Preferably, the hollow tubular member 84 is also formed of one of the aforementioned precious metals or base alloys thereof, such as platinum.

Since refractory metals are highly creep resistant, or even substantially "creep" free, even at elevated temperatures, fiber forming feeders produced according to the principles of this invention have good "sag" resistance. That is, the fiberization walls should not deform or bow as much as an all precious metal feeder. In some instances "sag" can be substantially eliminated over the life of the feeder. Thus, finshield alignments and the like with respect to the fiberization wall and/or tips can remain essentially fixed over the life of the feeder.

Laminate 69 can be fabricated as a substantially flat wall to provide a fiberization wall 14, generally, for a textile type feeder, or laminate 69 can be fabricated into a cylindrical fiberization wall 54 having orifices 77 and/or passageway 88 extending radially outward from the axis of rotation thereof, generally, for wool operations. In either case, orifices 77 or passageways 88 should be properly sized to permit the molten glass or inorganic material to flow therethrough in either a stationary or rotatable fiber forming system.

For a rotary fiber forming system 40, the circumferential fiberization wall 54 may be formed substantially identical to the system shown in FIG. 3 except that a circumferential wall 54 would be formed as a hoop instead of a substantially flat bottom wall 14.

As such working wall 54 may be adapted to flow the molten glass directly through orifices 71, that is, without tubular member 84 inserted in orifices 71. Or tubular members 84 may be incorporated as set forth above.

Other systems for providing a precious metal insert to protect the refractory metal core exposed by the orifices extending therethrough as set forth in the concurrently filed U.S. patent applications: Ser. No. 200,650, filed on Oct. 27, 1980 in the name of Mohinder S. Bhatti and Alfred Marzocchi and; Ser. No. 200,647, filed on Oct. 27, 1980 in the name of Mohinder S. Bhatti and; and Ser. No. 200,651, filed on Oct. 27, 1980 in the name of Mohinder S. Bhatti; all of which are hereby incorporated by reference.

It is apparent that within the scope of the invention, modifications and different arrangements can be made other than as herein disclosed. The present disclosure is merely illustrative with the invention comprehending all variations thereof.

INDUSTRIAL APPLICABILITY

The invention described herein is readily applicable to the formation of continuous and/or staple glass filaments.

We claim:

1. A feeder for supplying streams of molten glass to be attenuated into filaments comprising:
    a plurality of layers of material wherein one of said layers is a refractory metal and another of said layers is an oxygen impervious, precious metal, said plurality of layers being intimately bonded together by the application of isostatic pressure and heat to form a unitary laminate, said laminate having a plurality of apertures extending therethrough; and
    a plurality of elements bonded to the laminate and positioned in said apertures to prevent the oxidation of the refractory metal at elevated temperatures, said elements having an orifice adapted to permit the molten glass to flow therethrough to provide said streams of molten glass.

2. A feeder for flowing a stream of molten inorganic material therethrough comprising:
    a plurality of layers of material wherein one of said layers is a refractory metal and another of said layers is an oxygen impervious, precious metal, said plurality of layers being intimately bonded together by the application of isostatic pressure and heat to form a unitary laminate, said laminate having an aperture extending therethrough; and
    an element bonded to the laminate and positioned in said aperture to prevent the oxidation of the refractory metal at elevated temperatures, said element having an orifice adapted to permit the molten material to flow therethrough.

3. The feeder of claims 1 or 2 wherein said refractory metal and said precious metal are intimately bonded together.

4. The feeder of claim 3 where said refractory metal and said precious metal are metalurgically bonded together.

5. The feeder of claims 1 or 2 wherein said plurality of layers include a plurality of precious metal layers positioned at the exterior of said laminate.

6. The feeder of claim 1 wherein said elements have a flange intimately bonded to said precious metal.

7. The feeder of claims 1 or 2 wherein the refractory metal layer is a material selected from the group consisting of Ti, V, Cb, Ta, Cr, Mo, W, Re and base alloys thereof and wherein said precious metal layer is a material of the group consisting of Pt, Pd, Ir, Os, Rh, Ru and base alloys thereof.

8. The feeder of claim 7 wherein said element is a material of the group consisting of Pt, Pd, Ir, Os, Rh, Ru and base alloys thereof and wherein said element is intimately bonded to said refractory metal.

9. A method of making a feeder for supplying streams of molten glass to be attenuated into filaments comprising:
    assembling a plurality of layers of material wherein one of said layers is a refractory metal and another of said layers is a precious metal;
    isostatically pressing said plurality of layers;
    heating the isostatically pressed layers to intimately bond the plurality of layers to form a unitary laminate;
    forming a plurality of apertures in the laminate;
    bonding elements to the laminate in said apertures; and
    forming an orifice in said elements to permit the molten glass to issue therefrom as said streams, said precious metal layer and said element preventing the oxidation of said refractory metal layer at elevated temperatures.

10. A method of making a feeder for flowing a stream of molten inorganic material therethrough comprising:
    assembling a plurality of layers of material wherein one of said layers is a refractory metal and another of said layers is a precious metal;
    isostatically pressing said plurality of layers;
    heating the isostatically pressed layers to intimately bond the plurality of layers to form a unitary laminate;
    forming an aperture in the laminate;
    bonding an element to the laminate in said aperture; and
    forming an orifice in said element to permit the molten material to flow therethrough said precious metal layer and said element preventing the oxidation of said refractory metal layer at elevated temperatures.

11. The method of claims 9 and 10 wherein the refractory metal layer is a material selected from the group consisting of Ti, V, Cb, Ta, Cr, Mo, W, Re and base alloys thereof and wherein said precious metal layer and said element are a material of the group consisting of Pt, Pd, Ir, Os, Rh, Ru and base alloys thereof.

12. The method of claim 11 wherein the refractory metal is intimately bonded to said precious metal.

13. The method of claim 12 wherein the refractory metal is diffusion bonded to said precious metal.

* * * * *